US009403431B2

(12) United States Patent
Hagen

(10) Patent No.: US 9,403,431 B2
(45) Date of Patent: Aug. 2, 2016

(54) FUEL SYSTEM

(75) Inventor: Harald Hagen, Creussen (DE)

(73) Assignee: AUDI AG, Ingolstadt (DE)

( * ) Notice: Subject to any disclaimer, the term of this patent is extended or adjusted under 35 U.S.C. 154(b) by 933 days.

(21) Appl. No.: 13/328,320

(22) Filed: Dec. 16, 2011

(65) Prior Publication Data

US 2012/0175379 A1 Jul. 12, 2012

(30) Foreign Application Priority Data

Dec. 21, 2010 (DE) .......................... 10 2010 055 309

(51) Int. Cl.
*F02M 25/08* (2006.01)
*B60K 15/035* (2006.01)

(52) U.S. Cl.
CPC .............. *B60K 15/035* (2013.01); *F02M 25/08* (2013.01)

(58) Field of Classification Search
CPC ................... F02M 25/08; B60K 2015/03519; B60K 2015/03571; B60K 15/03504
USPC ........... 123/516, 518, 519; 137/587, 588, 589
See application file for complete search history.

(56) References Cited

U.S. PATENT DOCUMENTS

| | | | | |
|---|---|---|---|---|
| 3,687,335 A | * | 8/1972 | Hunter ........................... | 220/746 |
| 3,771,690 A | * | 11/1973 | Hunter ........................... | 220/746 |
| 3,917,109 A | * | 11/1975 | MacDonald ................... | 220/746 |
| 4,836,402 A | * | 6/1989 | Sasaki ............................ | 220/746 |
| 5,103,877 A | | 4/1992 | Sherwood et al. | |
| 5,215,110 A | * | 6/1993 | Benjey ............. | B60K 15/03519 137/43 |
| 5,275,213 A | * | 1/1994 | Perkins ................. | B60K 15/035 141/286 |
| 5,327,934 A | * | 7/1994 | Thompson ......... | F02M 25/0872 123/519 |
| 5,372,116 A | * | 12/1994 | Davis ............................. | 123/516 |
| 5,579,740 A | * | 12/1996 | Cotton et al. .................. | 123/516 |
| 5,601,114 A | * | 2/1997 | Hummel .......... | B60K 15/03519 137/588 |
| 5,687,762 A | * | 11/1997 | Teets ................ | B60K 15/03519 137/588 |
| 5,868,119 A | * | 2/1999 | Endo et al. ..................... | 123/516 |
| 5,913,294 A | * | 6/1999 | Takahashi et al. ...... | 123/198 DB |
| 5,950,688 A | * | 9/1999 | Langlois ........................... | 141/1 |
| 5,957,113 A | * | 9/1999 | Masaki et al. ................. | 123/518 |
| 5,983,963 A | * | 11/1999 | Pozgainer ........ | B60K 15/03519 137/588 |
| 6,000,426 A | * | 12/1999 | Tuckey et al. ................. | 137/588 |
| 6,176,259 B1 | * | 1/2001 | Harde et al. ................... | 137/587 |
| 6,276,387 B1 | * | 8/2001 | Pachciarz et al. ............... | 137/43 |
| 6,591,866 B2 | * | 7/2003 | Distelhoff et al. ........ | 137/565.22 |
| 6,634,342 B1 | * | 10/2003 | Wouters et al. ............... | 123/516 |
| 6,679,229 B2 | * | 1/2004 | Wada et al. .................... | 123/516 |
| 6,805,159 B2 | * | 10/2004 | Beaulne ................ | B60K 15/04 137/588 |
| 6,895,989 B2 | * | 5/2005 | Olshanetsky .... | B60K 15/03504 137/202 |
| 6,948,523 B2 | * | 9/2005 | Viebahn ........................ | 137/588 |
| 6,964,268 B2 | * | 11/2005 | Stickel .......................... | 123/516 |
| 7,383,856 B2 | | 6/2008 | Martis et al. | |
| 7,694,665 B2 | * | 4/2010 | Ehrman et al. ................. | 123/518 |

(Continued)

FOREIGN PATENT DOCUMENTS

| | | |
|---|---|---|
| DE | 199 32 713 | 1/2001 |
| DE | 101 20 542 | 7/2002 |

(Continued)

*Primary Examiner* — Thomas Moulis
(74) *Attorney, Agent, or Firm* — Henry M. Feiereisen LLC.

(57) ABSTRACT

A fuel system in particular of a motor vehicle, includes a fuel tank and a ventilation device for ventilating the fuel tank, wherein the ventilation device has at least one separation device which has a temporary accumulator for liquid fuel, and wherein the separation device has a fuel delivery device for delivering fuel out of the temporary accumulator. The fuel delivery device is integrated in the separation device.

15 Claims, 5 Drawing Sheets

(56) References Cited

U.S. PATENT DOCUMENTS

| | | | |
|---|---|---|---|
| 8,371,346 B2* | 2/2013 | Schmidt | B60K 15/03504 141/301 |
| 8,844,754 B2* | 9/2014 | Pozgainer et al. | 220/562 |
| 2002/0088439 A1 | 7/2002 | Distelhoff et al. | |
| 2002/0157715 A1 | 10/2002 | Voebahn et al. | |
| 2003/0079775 A1 | 5/2003 | Ehrman et al. | |
| 2003/0226596 A1 | 12/2003 | Bolle et al. | |
| 2004/0206398 A1 | 10/2004 | Olshanetsky et al. | |
| 2006/0191578 A1 | 8/2006 | Treudt et al. | |
| 2007/0175524 A1 | 8/2007 | Gebert et al. | |
| 2008/0302339 A1 | 12/2008 | Krogull et al. | |
| 2011/0284125 A1 | 11/2011 | Hagen | |
| 2012/0085424 A1 | 4/2012 | Hagen | |
| 2012/0111307 A1 | 5/2012 | Hagen | |

FOREIGN PATENT DOCUMENTS

| | | |
|---|---|---|
| DE | 102 25 327 | 8/2004 |
| DE | 10 2004 063 008 | 7/2006 |
| EP | 0 936 097 | 8/1999 |
| EP | 1 674 318 A1 | 6/2006 |
| WO | WO 2005/110797 A1 | 11/2005 |
| WO | WO 2007/065519 A1 | 7/2007 |

* cited by examiner

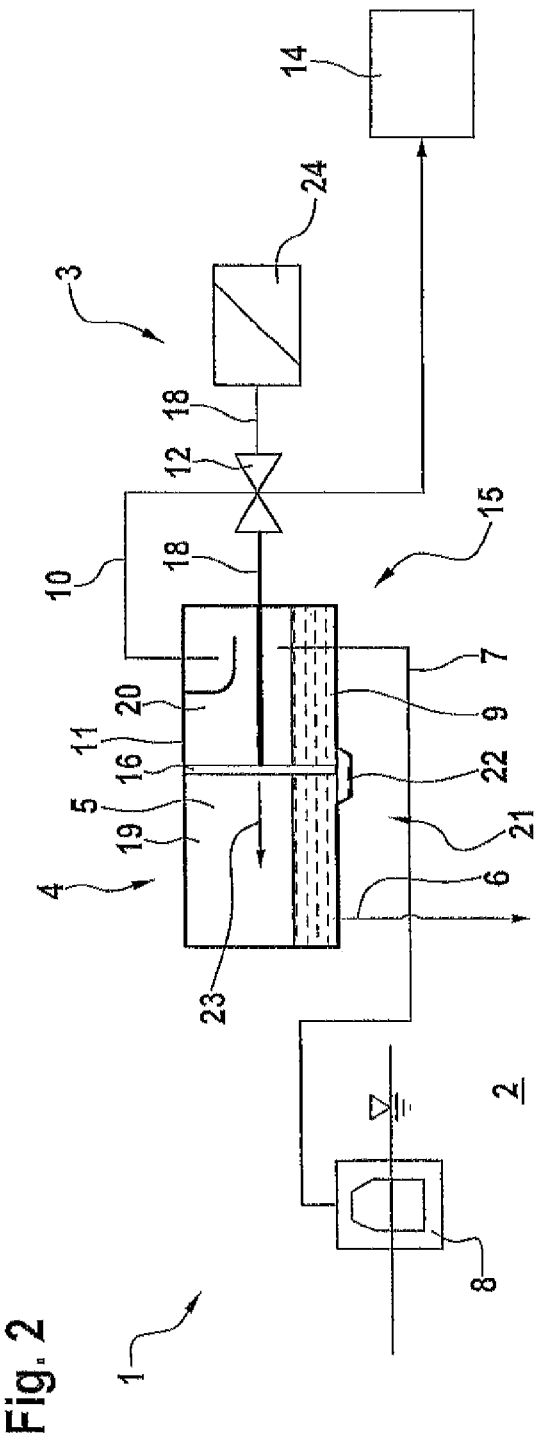

FUEL SYSTEM

CROSS-REFERENCES TO RELATED APPLICATIONS

This application claims the priority of German Patent Application, Serial No. 10 2010 055 309.3, filed Dec. 21, 2010, pursuant to 35 U.S.C. 119(a)-(d).

BACKGROUND OF THE INVENTION

The invention relates to a fuel system, in particular of a motor vehicle, with a fuel tank and a ventilation device for ventilating the fuel tank, wherein the ventilation device has at least one separation device which has a temporary accumulator for liquid fuel and wherein the separation device has a fuel delivery device for delivering fuel out of the temporary accumulator.

Fuel systems of the aforementioned type are known from the state of the art. They are assigned for example to a motor vehicle or a drive system of the motor vehicle. The drive system includes in particular at least one internal combustion engine and is for example configured as hybrid drive system, i.e. it includes the internal combustion engine as well as at least one electrical machine, wherein the internal combustion engine and the electrical machine at least temporarily jointly generate a drive torque of the drive system. The internal combustion engine is supplied with fuel from the fuel tank by the fuel system. Oftentimes, a volatile hydrocarbon fuel, for example gasoline, is used as fuel. The fuel tank therefore normally contains a volume of liquid fuel as well as a volume of gaseous fuel, which accrues in particular above the liquid fuel. The fuel tank can be a closed tank in particular a pressure tank, or a partially closed in particular also pressure free tank. The closed tank is used in particular for reducing emissions.

Due to temperature fluctuations of the fuel, for example caused by changes of the ambient temperature, pressure fluctuations can occur in the fuel tank. For this reason, the ventilation device is assigned to the fuel tank. It serves for ventilating the fuel tank. In this way, excessive pressure in the fuel tank can be reduced by the ventilating device. For this purpose the ventilation device ventilates the fuel tank for example through a ventilation line. During ventilation, gaseous as well as liquid fuel can exit the fuel tank through the ventilation device or the ventilation line. The ventilated fuel thus is first present as a mixture of gaseous and liquid fuel. This is particularly the case when the fuel tank is ventilated at a high internal pressure of the fuel tank. As a result of the high pressure or the great pressure difference between the pressure inside the fuel tank and the pressure outside the fuel tank, the ventilated fuel has high flow velocities, which causes liquid fuel to be carried along by the gaseous fuel.

The gaseous fuel can readily be supplied to the internal combustion engine or its intake system, wherein a fuel accumulator which is preferably configured as activated carbon filter can be provided between the fuel tank and the internal combustion engine. The fuel accumulator has the purpose to temporarily store gaseous fuel, i.e. to take up gaseous fuel when unused gaseous fuel is present and to give off gaseous fuel as soon as the gaseous fuel can be discharged into the internal combustion engine. However, liquid fuel must not enter the fuel accumulator or the internal combustion engine.

For this reason, the ventilation device has the at least one separation device which serves for separating gaseous and liquid fuel. The separation device thus has the purpose to prevent the transfer of liquid fuel from the fuel tank through the ventilation device into the internal combustion engine. The separation device separates liquid fuel and allows gaseous fuel to pass. The separated liquid fuel enters the temporary accumulator of the separation device. The term temporary accumulator does not mean that a (temporary) accumulation of the liquid fuel is indeed provided for. Rather, the liquid fuel can be discharged directly out of the temporary accumulator or the separation device preferably in the direction of the fuel tank. Here, however, a rise of the fill level of the temporary accumulator may result for example due to a limitation of the discharge volume flow, in particular by a line cross section or the like. Thus, the separated liquid fuel temporarily cannot be discharged at the same rate as it enters the temporary accumulator. Of course, a temporary storage of the liquid fuel, for example over a defined period of time can also be realized.

When operating the fuel system, the amount of liquid fuel present in the temporary accumulator or the separation device should be prevented from exceeding a threshold amount, i.e. from being greater than the fill level of the temporary accumulator, because this may impair the effectiveness of the separation device. The greater the amount of liquid fuel in the temporary accumulator, the greater is the risk that liquid fuel also escapes the separation device together with the gaseous fuel and is carried along in the direction of the fuel accumulator or the internal combustion engine. For this reason, the fuel delivery device can be assigned to the separation device. The former is used to deliver liquid fuel out of the temporary accumulator, in particular in the direction of the fuel tank. The fuel delivery device is usually configured as jet pump wherein fuel which is delivered by a fuel pump of the fuel system out of the fuel tank in the direction of internal combustion engine, is often used as means for driving the jet pump. However, the fuel pump is usually only operated so long as the internal combustion engine is active and has to be supplied with fuel. After deactivating the internal combustion engine the fuel pump as well as the jet pump is thus functionless. The fuel can thus no longer be conducted out of the temporary accumulator of the separation device although this may be desired for example because of an excessive fill level.

SUMMARY OF THE INVENTION

It is therefore an object of the invention to propose a fuel system in which a reliable discharge of the fuel from the temporary accumulator is possible, in particular when the fuel pump is deactivated.

According to the invention, this is attained in that the fuel delivery device is integrated in the separation device. This means, that the fuel delivery device is located in part in particular in its entirety in the separation device or a housing of the separation device. The fuel delivery device is operable independent of the fuel pump of the fuel system which fuel pump serves for delivering fuel in the direction of the internal combustion engine. With the integrated fuel delivery device fuel can be delivered out of the temporary accumulator also in the case when the fuel pump of the fuel system is deactivated i.e. does not deliver fuel out of the fuel tank. Preferably, the fuel delivery device can be operated or driven electrically. The integration of the fuel delivery device in the separation device also achieves a smaller construction size.

In a refinement of the invention, the fuel delivery device has at least one piston which is arranged at least in part in the temporary accumulator, in particular a single piston or a double piston, and/or a pivotally mounted flap. The piston or the flap allows achieving a delivery action. The piston or the flap is movable within the temporary accumulator, wherein the piston is configured or mounted for a linear motion and the flap for a pivotal motion. For achieving the delivery action the piston or the flap divide the temporary accumulator into at least one first and one second chamber. In at least one position of the piston or the flap the flow communication between the chambers is interrupted. However it can be provided that in at least one further position of the piston or the flap the flow communication between the chambers provided. The delivery action of the fuel deliver unit is achievable by the motion of the piston (linear motion) or the flap (pivotal motion). The piston can be configured as single piston or as double piston. If the piston is a single piston the delivery action is achieved in only one direction when the piston moves. In contrast, if the piston is configured as double piston the delivery action occurs in a movement in the first direction as well as in a second direction which is opposite to the first direction.

In a refinement of the invention, the piston or the flap divides the temporary accumulator into a first and a second chamber, wherein means are provided via which the chambers are in flow communication with one another in at least one position of the piston or the flap. The means can be configured in such a manner that the flow communication is only established when the piston or the flap are in the one position or within a region of a position. However, as an alternative, the means can also be configured so that the flow communication is established preferably in case of a motion of the piston or the flap. In particular flow communication is established in case of a motion of the piston or the flap in the first direction while it is interrupted in case of a motion in the second direction.

In a refinement of the invention, the means have an overflow channel and/or an outlet valve in particular an outlet valve which traverses the flap. The overflow channel is preferably located in a wall of the temporary accumulator. For example, it is configured as open-edge recess in the latter. In the region of the overflow channel the temporary accumulator is dimensioned greater when viewed in radial direction (corresponding to the radial extent of the piston) than in other regions of the temporary accumulator. The fuel can flow past the piston or the flap when the piston or the flap is located in the region of the overflow channel. When the piston or the flap is moved out of the region of the overflow channel, however, the flow communication is interrupted. As an alternative or in addition, the means can also include the outlet valve. The latter is in particular spring loaded so that it opens in case of a motion of the piston or the flap in the first direction and closes or remains closed, respectively, in case of a motion of the latter in the second direction which is opposite the first direction. Particularly preferably, the outlet valve is provided on the piston or the flap and traverses the piston or the flap.

In a refinement of the invention, an actuation device which preferably has at least one electromagnet is assigned to the fuel delivery device. The actuating device serves for operating the fuel deliver unit for delivering fuel out of the temporary accumulator. The actuating device is preferably an electrical actuating device which operable independent of the fuel system. The actuating device can have at least one electromagnet. In particular the actuating device serves for causing a motion of the piston or the flap.

In a refinement of the invention, a ventilation valve is fluidly arranged upstream or downstream of the separation device for ventilating the fuel tank by the separation device. The ventilation valve is assigned to the ventilation device. The ventilation valve can be adjusted so that it opens for ventilating the fuel tank or closes for interrupting the ventilation. It can for example be an FTIV (Fuel Tank Isolation Valve). The ventilation valve can be configured as timing valve which allows setting discrete switching states (open and closed). Particularly preferably, the ventilation valve is configured as proportional valve, which not merely allows the discrete switching states but allows an adjustment of the flow through cross section in multiple stages particularly preferably a continuous adjustment. In this way, the volume flow through the separation device can be adjusted in a continuous manner and through open-loop and/or closed-loop control. The ventilation valve is fluidly arranged upstream or downstream of the separation device, thus the fuel always also has to pass the ventilation valve in order to flow through the separation device. The ventilation valve can be integrated with the separation device or the fuel delivery device. The ventilation valve can also be integrated in a modular fashion into the fuel delivery device.

In a refinement of the invention, the fuel delivery device as well as the ventilation valve are actuatable by the actuation device, in particular separate from one another or jointly. The actuation device is in this respect a common actuation device, so that a single actuation device is sufficient to actuate the fuel delivery device as well as the ventilation valve. As described before, the ventilation valve can be integrated in the fuel delivery device, i.e. be a common component. In this case, an integration of the actuation device with the ventilation valve is also preferred. The actuation can take place separate from one another or jointly. In the latter case a simultaneous actuation of the fuel delivery device as well as the ventilation valve takes place by means of the actuation device. Thus with the common actuation device, the fuel delivery device can be actuated for delivery of fuel out of the temporary accumulator as well as the ventilation of the fuel tank can be effected by means of the ventilation valve. Particularly preferably is the integration of fuel delivery device, ventilation valve and actuation device, because with this the ventilation of the fuel tank as well as the emptying of the temporary accumulator is possible with a single component which is located at least in part in the separation device.

In a refinement of the invention, the actuation device can be controlled for carrying out an actuation motion in a first direction and in a second direction which is opposite to the first direction and/or by a first lift and a second greater lift, wherein carrying out the actuation motion in the first direction or by the first lift actuates the fuel delivery device and/or the ventilation valve and carrying out the actuation motion in the second direction or by the second lift actuates the ventilation and/or the fuel delivery device. In a first embodiment, the actuation device thus carries out the actuation motion in two directions and in a second embodiment it carries out the actuation motion with two different lifts. The actuation device and the fuel delivery device as well as the ventilation valve are operatively connected in such a manner that depending on the direction or the lift either the fuel delivery device or the ventilation valve is actuated. In this way, the actuation device can be configured as common actuation device for the fuel delivery device as well as for the ventilation valve, however, allow a separate i.e. not simultaneous actuation of fuel delivery device and ventilation valve.

In a refinement of the invention, the flap is configured for an actuation by inertial motion. Inertial motion relates to a motion of the fuel delivery device or the fuel system, which for example is caused by a motion of the motor vehicle. The inertial motion includes for example also vibrations and the like which in particular can occur during operation of the internal combustion engine. The flap is preferably configured so that the motion of the flap in the first or second direction is caused when a corresponding inertial motion occurs. For example, the pivot axis of the flap is parallel to an underground of the motor vehicle, however, perpendicular to the driving direction of the latter. In this way, the actuation of the flap and with this a delivery action of the fuel delivery device can be caused as a result of acceleration and deceleration processes of the motor vehicle.

In a refinement of the invention, at least one ventilation valve which switches in dependence on the fuel tank fill level and/or at least one safety valve which is assigned to the fuel tank, are fluidly arranged upstream of the separation device. The ventilation valve is in particular an FLVV (Fill Limit Venting Valve) The latter enables a ventilation of the fuel tank sol long as the fuel tank fill level is smaller than a defined fuel tank fill level, in particular a maximal fuel tank fill level. Thus, the ventilation of the fuel tank is ensured via the ventilation valve. In addition, or as alternative the safety valve can be provided which for example is configured as roll-over safety valve or ROV (roll over vale). The ventilation valve and the safety valve are usually assigned to the fuel tank and are fluidly arranged upstream of the separation device, so that the fuel first passes the safety valve before entering the separation device.

The invention also relates to a drive system with a fuel system according to the description above. The drive system has in particular at least one internal combustion engine and is for example constructed as hybrid drive system.

BRIEF DESCRIPTION OF THE DRAWING

In the following, the invention is explained in more detail by way of exemplary embodiments shown in the drawing, without narrowing the invention. It is shown in:

FIG. 2 the fuel system in a second embodiment;

FIG. 3 a region of the fuel system in a third embodiment,

DETAILED DESCRIPTION OF PREFERRED EMBODIMENTS

Figure 1:
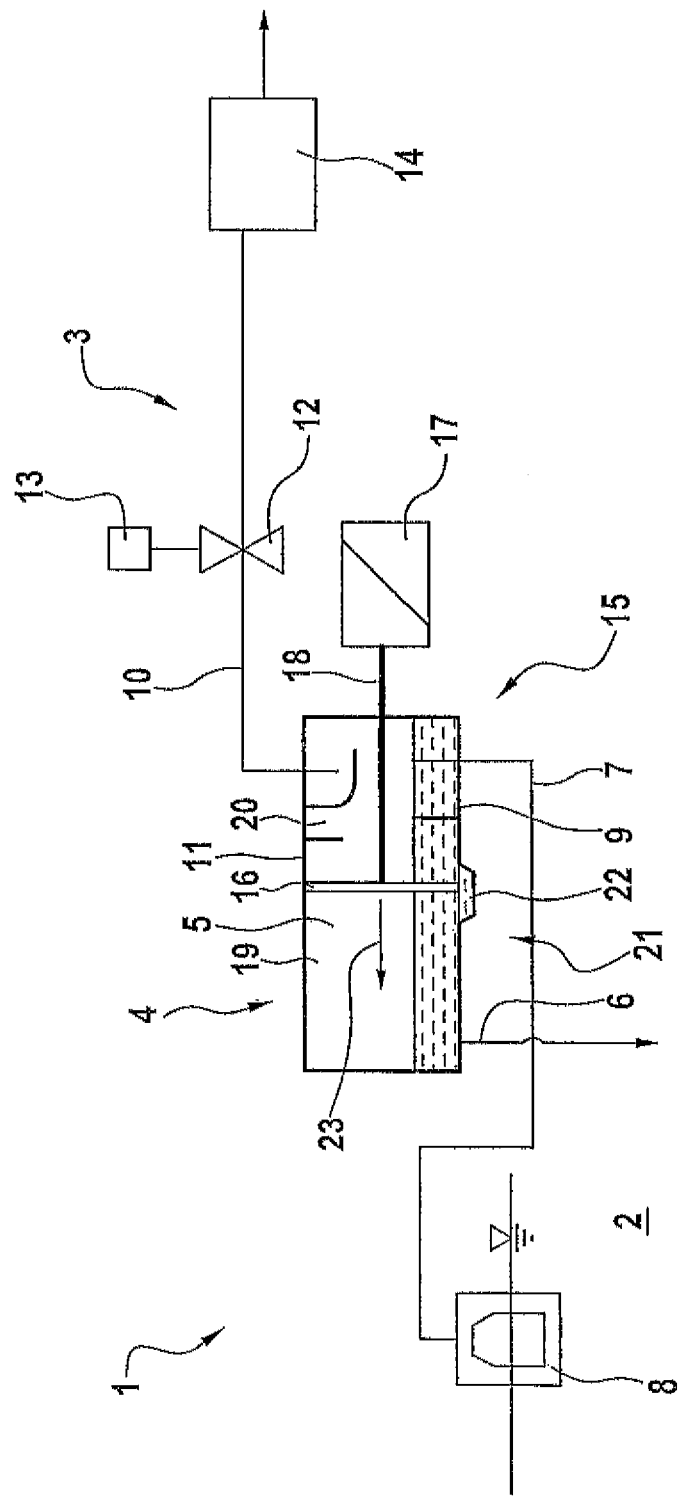
FIG. 1 a schematic representation of a fuel system in a first embodiment.

FIG. 1 shows a schematic representation of a fuel system 1. The fuel system 1 is for example part of a motor vehicle or a drive system of the motor vehicle. The fuel system 1 has a fuel tank 2 and a ventilation device 3 for ventilating the fuel tank 1. The ventilation device 3 has a separation device 4 with a temporary accumulator 5. The separation device 4 serves for separating liquid fuel from a mixture of liquid and gaseous fuel. The separated liquid fuel is subsequently present in the temporary accumulator 5 and can, for example be fed into the fuel tank 2 through the return line 6. Preferably, the return line 6 has a valve, in particular a drainage valve or check valve. Instead of the return line 6, only the valve may also be provided, in particular when the separation device 4 is located at least in part, in the fuel tank 2, so that fuel which exits the temporary accumulator 5 directly reaches the fuel tank. The valve is configured so that fuel can only exit the temporary accumulator 5 through the return line 6, however, it is unable to enter the latter. This prevents, that fuel can move from the fuel tank 2 through the return line 6 into the temporary accumulator 5.

The ventilation device 3 is in flow communication with the fuel tank 2 via a ventilation line 7. On the side of the ventilation line 7 which faces the fuel tank 2 or in the fuel tank 2, an aeration valve 8 is provided which switches in dependence on the fuel tank fill level. Usually, the ventilation valve 8 is configured so that it is only opens in case of a fuel fill level below a defined fuel fill level in particular a maximal fuel fill level, i.e. fuel, in particular gaseous fuel can enter the ventilation line 7. The ventilation line 7 leads into the temporary accumulator 5 of the separation device 4, preferably through a ceiling 11 of the temporary accumulator 5. The site of entry of the outlet line 10 into the temporary accumulator 5 is thus preferably arranged so that only gaseous fuel can enter the outlet line 10 from the temporary accumulator 5. For this purpose, the sites of entry of the outlet line 10 and the ventilation line 7 are preferably arranged at opposing sides of the temporary accumulator 5. The outlet line 10 has a ventilation valve 12, which is actuatable by means of an actuation device 13. The ventilation valve 12 and the actuation device 13 are preferably configured so that the flow through cross section of the ventilation valve 12 can be adjusted in a continuous manner. On the side which faces away from the separation device 4 the outlet line 10 leads into a fuel accumulator 14 in particular an activated carbon filter. The fuel accumulator 14 serves for temporary accumulation of gaseous fuel.

The separation device 4 is usually at least in part in particular in its entirety arranged in the fuel tank 2. An arrangement outside the fuel tank 2 is also possible however. As an alternative, the separation device 4 can also be integrated in a line for example the ventilation line 7. In a preferred embodiment, the separation device is configured so that it or the ventilation device 3 has a defined pressure loss. The latter is chosen such that when the fuel tank 2 is ventilated by means of the ventilation device, a valve which may be present, for example the aeration valve 8 is not brought into the closed position of the latter. The aeration valve usually has a float which unblocks a valve seat of the aeration valve 8 so long as the fuel tank fill level is smaller than a defined fuel fill level. If the volume flow which is discharged by the ventilation device, i.e. through the aeration valve, becomes greater than a design volume flow, the float can be displaced by the ventilated fuel, i.e. can be brought into the closed position so that a further ventilation of the fuel tank 2 is not possible. This applies in particular when the ventilation valve 12 is completely open.

Usually the pressure loss of the ventilation device 3 is adjusted by adjusting the ventilation valve 12, for example by introducing a throttle element. Preferably, the pressure loss of the venting device 3 takes place by adjusting the separation device 4 or the pressure loss of the latter, for example by providing an adjusted throttle element. The venting valve 12 has thus preferably no throttle element. The throttle element can however of course be provided in addition.

To be able to operate fuel independent of an operation or the internal combustion engine or a fuel pump of the fuel system, which fuel pump delivers fuel form the fuel tank in the direction of the internal combustion engine, the separation device 4 has a fuel delivery device 15, which is integrated in the separation device 4. In the embodiment of the fuel system 1 shown in FIG. 1, the fuel delivery device 15 has a piston 16 which is arranged in the temporary accumulator 5 and is mounted for linear motion at this location. The linear motion of the piston 16 is effected by means of an actuation device 17. For this purpose, the piston 16 is operatively connected to the actuation device 17 via a coupling rod 18.

The piston 16 divides the temporary accumulator 5 into a first chamber 19 and a second chamber 20. The volumes of the chambers 19 and 20 are adjustable though a motion of the piston 16. The fuel system 1 has means 21 via which the chambers 19 and 20 are in flow communication with one another in at least one position of the piston 16. The means 21 are here configured as overflow channel 22. The overflow channel 22 is an open edge radial recess—corresponding to a radial extent of the piston 16—which radial extent is located in a wall of the temporary accumulator 5. When the piston 16 is arranged in the region of the overflow channel 22, fuel can flow back and forth between the chambers 19 and 20, so that to this extent an even fill level exists in the chambers 19 and 20. Thus, if fuel enters the separation device 4 through the ventilation line 7 and liquid fuel is subsequently discharged from the latter, the fill level does not only rise in the second chamber 20 but also correspondingly in the first chamber 19.

When the piston 16 is moved in a first direction (arrow 23) by means of the actuation device, the piston causes a delivery action of the fuel delivery device 15. This means, that the pressure in the first chamber 19 is increased by the motion of the piston 16 due to a decrease in volume, so that fuel is urged through the return line 6 in the direction of the fuel tank 2. In this way, fuel can also be delivered out of the temporary accumulator 5 into the fuel tank 2 when this cannot be realized by other means for example the influence of gravity. The piston 16 in this case is a single piston. Thus, it is intended that the delivery action only occurs in the first direction. However, when the piston 16 is moved in a second direction, which is opposite to the first direction no delivery action of the fuel delivery device 15 occurs.

FIG. 2 shows a schematic representation of a second embodiment of the fuel system 1. The individual elements correspond essentially to the ones of the fuel system which was describe with reference to FIG. 1, so that insofar reference is being made to the above embodiments. In contrast to the embodiment described with reference to FIG. 1, the actuation devices 13 and 17 in this case are a common actuation device 24. The ventilation valve as well as the fuel delivery device 15 are actuatable by means of the common actuation device 24. The actuation can occur jointly or separate from one another. For this purpose, the actuation device 24 can be configured for example to carry out actuating motions in a first direction and in a second direction which is opposite to the first direction. As an alternative, the actuation device 24 can also be provided for carrying out the actuation motion by a first lift or a second greater lift. Carrying out the actuation motion in the first direction or by the first lift is intended to actuate the fuel delivery device 15 and carrying out the actuation motion in the second direction or by the second lift is intended to actuate the ventilation valve 12 or vice versa.

FIG. 3 shows a section of a third embodiment of the fuel system 1. In this embodiment, the means 21 are not configured in form of the overflow channel 22, but in form of an outlet valve 25. The outlet valve 25 is preferably configured so that it closes or remains closed in case of a motion of the piston 16 in the first direction and opens or remains open in case of a motion in the second direction, so that chambers 19 and 20 are in flow communication with one another and fuel can flow from the second chamber 20 into the first chamber 19. The outlet valve 25 is for example spring preloaded wherein the spring force seeks to close the outlet valve 25. It is noted that in all described embodiments of the fuel system 1 the means 21 can be configured in any manner, i.e. they can either be an overflow channel 22 or an outlet valve 25. The means 21 can also include the overflow channel 22 and the outflow valve 25.

Figure 4:
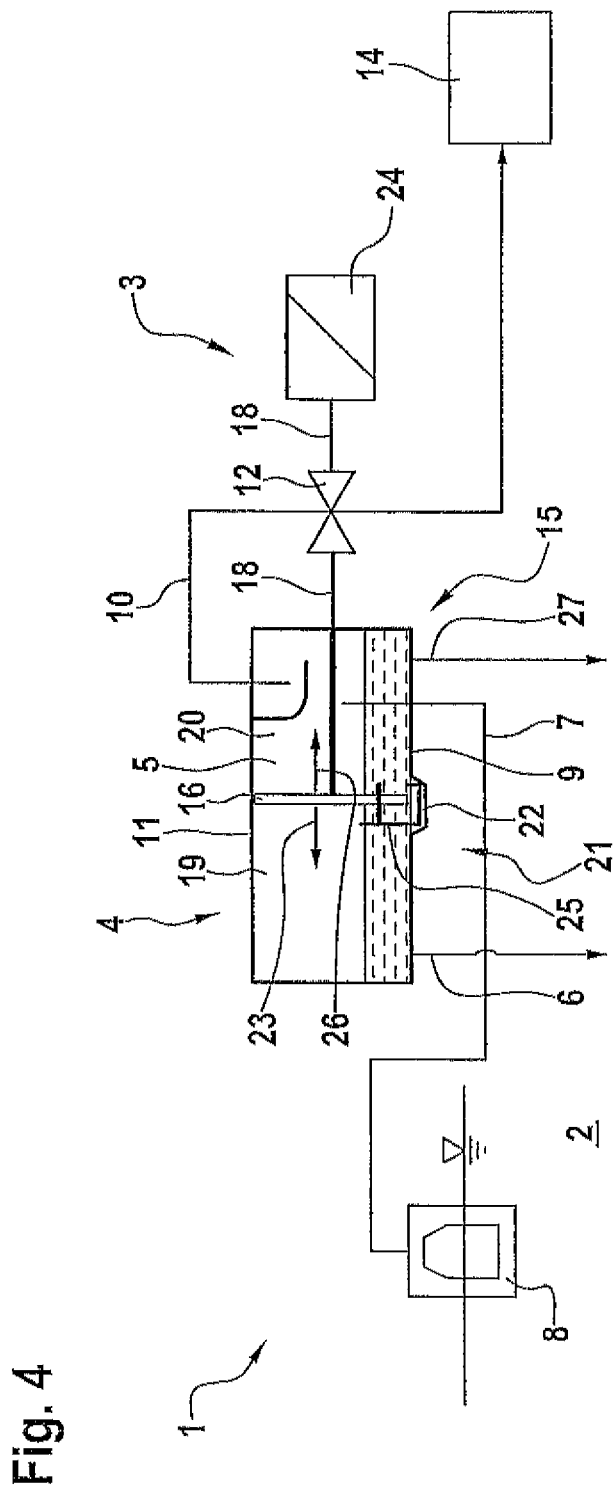
FIG. 4 the fuel system in a fourth embodiment.

FIG. 4 shows a fourth embodiment of the fuel system 1. The essential elements again correspond to those of the fuel system 1 described with reference to FIGS. 1 to 3, so that insofar reference is made to the preceding descriptions. The piston 16 shown here is configured as double piston. Thus, a delivery action of the piston 16 in the first direction (arrow 23) as well as in the second direction (arrow 26) is provided. Correspondingly, multiple return lines 6 and 27 are provided, wherein the return line 6 as in the previously described fuel systems 1 is fluidly assigned to the first chamber 19. The return line 27 in contrast is fluidly assigned to the second chamber 20. In case of a motion of the piston 16 in the first direction (arrow 23) fuel can be delivered from the first chamber 19 through the return line 6 and in case of a motion in the second direction (arrow 26) be delivered from the second chamber 20 through the return line 27.

Figure 5:
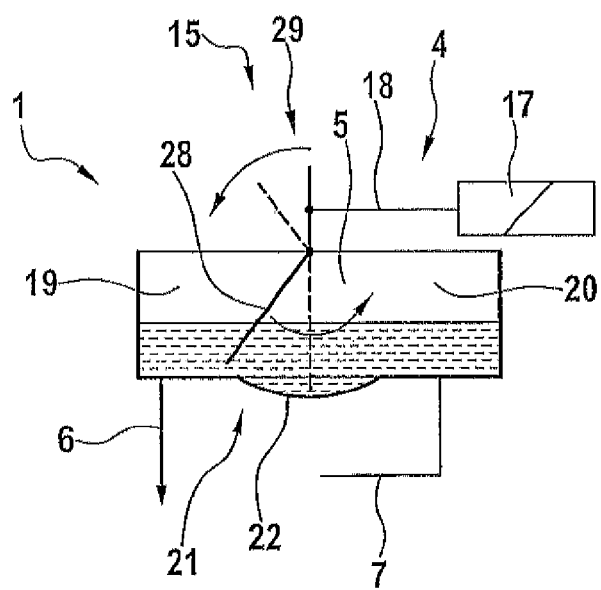
FIG. 5 the fuel system in a fifth embodiment.

FIG. 5 shows a fifth embodiment of the fuel system 1, wherein only a section is shown. In principle, the fuel system 1 shown here or the separation device 4 are configured according to the preceding elaborations, so that insofar reference is made to the latter. Instead of the piston 16 however, the fuel delivery device 15 here has a flap 28. The latter is operatively connected to the actuation device 17 or the common actuation device 24 (not shown) via the coupling rod 18 or a joint system 29. The flap 28 is provided in the temporary accumulator 5 and divides the latter like the piston 16, into the first chamber 19 and the second chamber 20. The flap 28 is mounted pivotal wherein when the flap is actuated the pivot motion is carried out by means of the actuation device 17 or 24. Corresponding to the motion of the piston 16, the pivot motion causes the delivery action of the fuel deliver unit 15.

Figure 6:
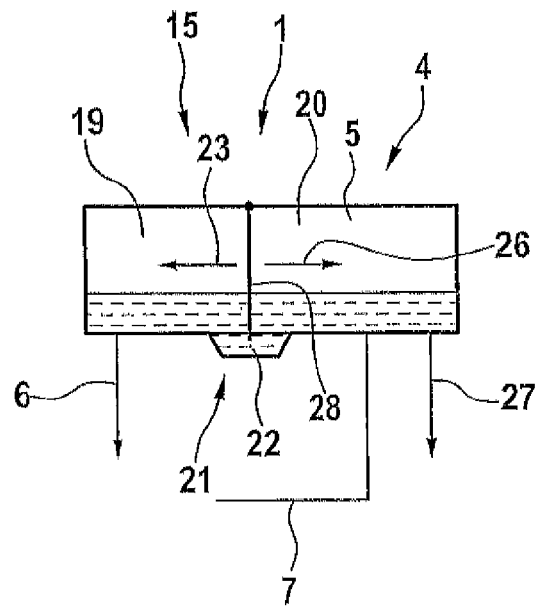
FIG. 6 a region of the fuel system in a sixth embodiment.

FIG. 6 shows a sixth embodiment of the fuel system 1 wherein again only a section is shown. With regard to the construction of the fuel system 1 reference is again made to the preceding elaborations. The flap 28 is here configured for an actuation by inertial motion. This means, that it is mounted pivotal in the temporary accumulator 5 so that in case of a motion of the fuel system 1 or the motor vehicle a motion of the flap 28 in the first or second direction (arrows 23 and 26) is caused. In the embodiment shown in FIG. 6, the return line 6 as well as the return line 27 are provided. As an alternative, only a return line 6 and 27 i.e. a delivery action in only one direction can be provided.

Figure 7:
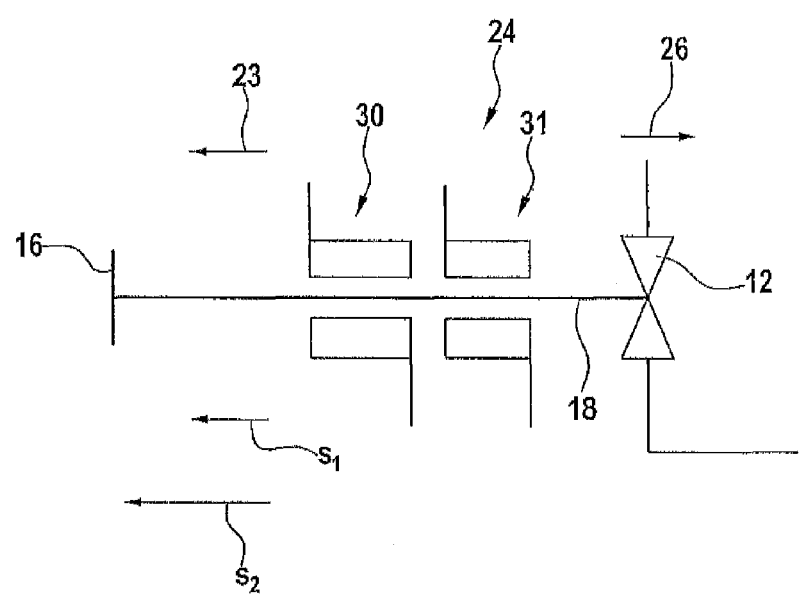
FIG. 7 an actuation device of the fuel system in a first and a second embodiment.

FIG. 7 shows a first embodiment of the common actuation device 24. Beside the actuation device 24, the piston 16 and the ventilation valve 12 are also shown. The actuation device 24 has two electromagnets or electromagnet systems 30 and 31, respectively. The actuation device 24 is either configured to execute the motion of the piston 16 or the flap 28 in the first direction (arrow 23) or in the second direction (arrow 26) or by a first lift (s1) or a second greater lift (s2). The piston 16 and the ventilation valve 12 are operatively connected to the actuation device 24 via the coupling rod 18 so that when carrying out the motion in the first direction or by the first lift, only the fuel delivery device 15 i.e. the piston 16 or the flap 28, respectively but not the ventilation valve 12 is actuated, and when carrying out the motion in the second direction or by the second lift only the ventilation valve 12 but not the fuel delivery device 15 is actuated.

For example, when only the electromagnet 30 is supplied with current, a motion in the first direction or by the first lift may be established, and when only the electromagnet 31 is supplied with current the motion in the second direction or by the second lift may be established. As an alternative, the actuation motion by the second lift can also be caused by supplying the electromagnet 30 as well as the electromagnet 31 with current, wherein same or different voltages (for example 5V and 12V) can be used.

Further, the separation device 4 can have a fill level determination device which is not shown here for determining the fill level in the temporary accumulator 5. The ventilation valve 12 and/or the fuel delivery means 15 can be operated through open-loop and/or closed-loop control. In particular, the fuel delivery device 15 should only be operated when the fill level of the temporary accumulator 5 is greater or equal to a defined fill level in particular a maximal fill level.

What is claimed is:

1. A fuel system, comprising:
   a fuel tank; and
   a ventilation device for ventilating the fuel tank, said ventilation device comprising at least one separation device, said at least one separation device comprising a temporary accumulator for liquid fuel and a fuel delivery device for delivering fuel out of the temporary accumulator, said fuel delivery device being integrated in the separation device, said fuel delivery device comprising at least one of a piston and a pivotally mounted flap, said piston and said pivotally mounted flap being constructed for displacement of the fuel out of the liquid separator, wherein the piston is arranged at least in part in the temporary accumulator.

2. The fuel system of claim 1, wherein the fuel system comprises at least the piston, and wherein the piston is a single piston or a double piston.

3. The fuel system of claim 1, wherein the piston or the flap divide the temporary accumulator into at least one first chamber and one second chamber, the system further comprising means via which at least in one position of the piston or the flap the at least one first and one second chambers are in flow communication with one another, and wherein in at least one further position of the piston or the flap the flow communication between the at least one first and one second chambers is interrupted.

4. The fuel system of claim 3, wherein the means include an overflow channel and/or an outlet valve.

5. The fuel system of claim 4, wherein the means include the outlet valve, and wherein the outlet valve traverses the piston or the flap.

6. The fuel system of claim 1, further comprising an actuation device, said actuation device being assigned to the fuel delivery device.

7. The fuel system of claim 6, wherein the actuation device has at least one electromagnet.

8. The fuel system of claim 1, further comprising at least one ventilation valve which is fluidly arranged upstream or downstream of the separation device for ventilating the fuel tank through the separation device.

9. The fuel system of claim 1, wherein the fuel delivery device and the ventilation valve are actuatable by the actuation device.

10. The fuel system of claim 1, wherein the fuel delivery device and the ventilation valve are actuatable jointly or separate from one another by the actuation device.

11. The fuel system of claim 6, wherein the actuation device is controllable for implementing an actuation motion in a first direction and in a second direction which is opposite to the first direction and/or for implementing a first lift and a second lift which is greater than the first lift, wherein the actuation motion in the first or second direction or by the first or second lift actuates the fuel delivery device and/or the ventilation valve.

12. The fuel system of claim 11, wherein the actuation motion in the first direction or the first lift actuates the fuel delivery device, and the actuation motion in the second direction or the second lift actuates the ventilation valve.

13. The Fuel system of claim 1, wherein the flap is configured for actuation by inertial motion.

14. The fuel system of claim 1, further comprising at least one member selected from the group consisting of a ventilation valve which switches in dependence on the fuel fill level and a safety valve which is assigned to the fuel tank, wherein the member is fluidly arranged upstream of the separation device.

15. The fuel system of claim 1 for use in a motor vehicle.

* * * * *